3,366,445
MULLITE PRODUCTION
Edward Einstein, Homestead, Eldon D. Miller, Jr., Bridgeville, and Earl Leatham, Wexford, Pa., assignors to Harbison-Walker Refractories Company, Pittsburgh, Pa., a corporation of Pennsylvania
Continuation-in-part of application Ser. No. 321,764, Nov. 6, 1963. This application Feb. 26, 1964, Ser. No. 347,499
11 Claims. (Cl. 23—110)

This application is a continuation-in-part of application, Ser. No. 321,764, filed Nov. 6, 1963, and now abandoned and assigned to the assignee of the present application.

The present invention relates to a process for producing mullite aggregate of superior stability from crude bauxite.

Heretofore, many difficulties have been encountered in the production of mullite from various alumina silica ores. In particular, mullite production from crude bauxite has posed serious problems in that the impurity level, especially iron impurities (about 2 or 3%, by weight) is relatively high and known methods for removal thereof are uneconomical or complex. For instance, bauxitic ores have been subjected to various grinding operations in the dry state to mix and blend the materials, followed by flotation or other expensive chemical methods for removal of impurities.

Other workers have suggested producing mullite from an ore having an original alumina silica ratio closely approximating the mullite chemical composition, then heating the ore to produce mullite, grinding the mullite, and performing subsequent heat treatments on the grain for brickmaking purposes. However, ores of this type are rarely found.

Iron impurities, if present in substantial amounts in a refractory shape comprised of mullite, would be deleterious to load bearing, spall resisting, and slag resisting properties of the shape. The methods mentioned previously for preparing the bauxite ore in which one or more grinding operations were employed to decrease the particle size of the bauxite also decreased the size of the iron impurities and rendered removal more difficult and costly.

Therefore, an object of the present invention is to provide a process for producing substantially iron-free mullite from crude bauxite.

Another object of the invention is to provide a novel process for producing relatively stable mullite aggregate from crude bauxite.

Still another object of the invention is to provide a process for economically producing mullite from crude bauxite. Other objects of the invention will become apparent hereinafter.

In order to more fully understand the nature and scope of the invention, reference should be had to the drawings.

Briefly, according to one aspect of the invention, there is provided a novel process for producing a stable mullite aggregate from crude bauxitic ore. The method includes agitating and dispersing the bauxite ore to obtain a uniform aqueous suspension in which bauxite material is physically disassociated from nonbauxitic impurities which may then be easily removed. The resulting mixture is screened through a sieve of suitable size for instance, a 10 to 48 mesh (Tyler) sieve or separated hydraulically to remove the coarse impurities. If desired, the slurry may be treated by passing it through a filter to concentrate the solids to as high as about 70 to 75%, by weight, on the wet basis, prior to introducing the material into the rotary kiln.

There is a residence time of at least about 2 hours. The temperature of the hot zone of the kiln is maintained between about 2900° F. and a temperature just below the incipient fusion point of the bauxitic material, to form relatively large, well-developed, and closely-packed crystals of mullite thereby providing stable grains.

According to another embodiment of the invention, the slurry, after impurity removal, is blended with a flocculating agent to form a relatively coarse aggregate and the aggregate is fed to the rotary kiln and burned as described above.

Figure 1:
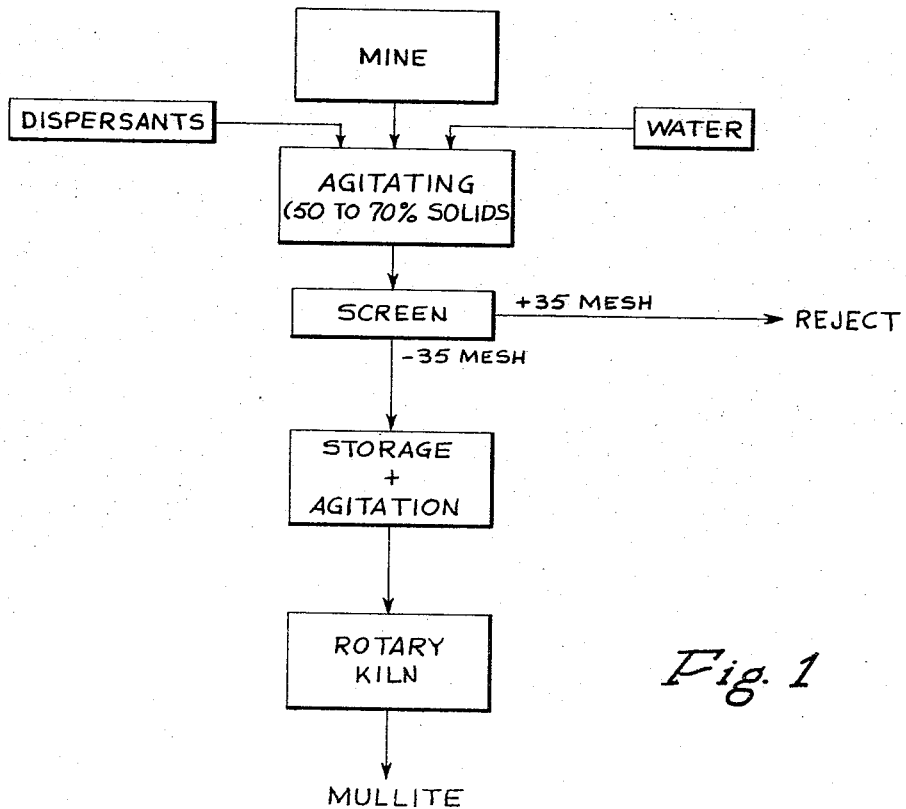
FIG. 1 is a schematic representation of a flow sheet of the process.

More particularly, and with reference to the flow diagram (FIG. 1), the bauxitic ore processed in accordance with the invention contains, by weight, on an oxide ignition free basis, at least about 70 to 80%, and preferably 72 to 75% $Al_2O_3$. The crude ore is placed in a dispersing tank having agitating means such as a group of Lightnin' mixers. The agitating means may be of any conventional type though, such as, other mechanical stirrers, beaters, pumps, and the like. It should be appreciated that where the run of the mine ore contains large pieces (+2") and a dispersing tank is relatively small, it will be desirable to fracture the large pieces; however, this is not always a necessary step in the process. Water and a dispersing agent are added to the dispersing tank and the mixture is agitated at about 400 to 500 r.p.m. in a preferred embodiment. The agitation is carried out to yield a uniform or homogeneous almost colloidal suspension of bauxitic material containing from 40 to 70%, by weight, of solids consisting, on analysis, primarily of silica and alumina with a small amount of fine trace impurities. Substantially all the impurities, predominantly insoluble iron salts, will be released from the particles of bauxitic material in the dispersing tank. It is believed that in order for the bauxitic material to remain in suspension, the agitation should be carried out until practically all of the material has a particle size having an upper limit of 10 microns.

Many dispersing agents have been tested to provide the required colloidal suspension. For example, sodium silicate, sodium carbonate, sodium citrate, ammonium hydroxide, ortho and polyphosphates of alkaline metal, water soluble phosphate glasses, and proprietary organic polyelectrolites have been successful dispersants. The dispersing agent may be added in amounts from about 0.1 to 2%, by weight, based on the total weight of dry solids in the dispersant tank. The actual amount of dispersant added is governed by the particular agent used, economy and consideration of the tendency to introduce impurities to the mixture. A particularly good and preferred dispersing agent for the purposes of this invention is a mixture which consists of a 1:2 to 5:1 (by weight) mixture of sodium phosphate glass (containing approximately 67% $P_2O_5$) and ammonia in the form of ammonium hydroxide. The above dispersant works particularly well in amounts from 0.1 to 1% per weight unit of dry solid with 0.5% being optimum. Further, it is preferred that the solid concentration in the colloidal suspension be maintained at 50% or more since a lesser amount extends the time of the subsequent drying and burning operation.

The suspension, still in its substantially uniform state of dispersion, is passed through a suitable sieve or hydraulic separator to remove the coarse nonbauxitic impurities. It has been found that a 35 mesh screen or sieve (Tyler) is quite satisfactory to remove substantially all of the impurities viz. $Fe_2O_3$ and quartz. However, it should be understood that other screens may be employed for impurity removal depending upon the particular ore deposit employed and the particle size of naturally contained impurities.

In some instances, there remains with the plus 35 mesh fraction of nonbauxitic impurities a small number of alumina nodules. These nodules may be subjected to a light crushing, or more aptly "fracturing," operation and then recirculated through the dispersing tank. By "fracture" and "fracturing" we mean to describe exertion of only sufficient force to break up alumina nodules and lumps of bauxite, but not sufficient to break up the much harder nodules of iron salts, such as pyrite, etc. Alternatively, the alumina nodules may be broken up and uniformly suspended by increasing the agitating action in the dispersing tank up to, for example, 800 r.p.m.

The agitation and dispersion of the bauxitic material is so complete that from 90 to 95% of the −35 mesh material has an average particle diameter of from 2 to 5 microns, and this is considered indicative of the uniformity obtainable.

The screened suspension is fed to a storage tank, if necessary, and suitably agitated to maintain the uniform quality of the suspension. Owing to the fine particle size of the bauxitic material, the agitation need not be too rigorous as the small particles tend to remain in suspension. A stirring action of about 20 r.p.m. is satisfactory when the material must remain in suspension for any extended period of time. It should be noted that any fine impurities remaining in the mixture will be uniformly suspended throughout with the alumina and silica of the bauxite so as not to be deleterious to brick made subsequently from the resulting mullite grain of this invention.

Figure 2:
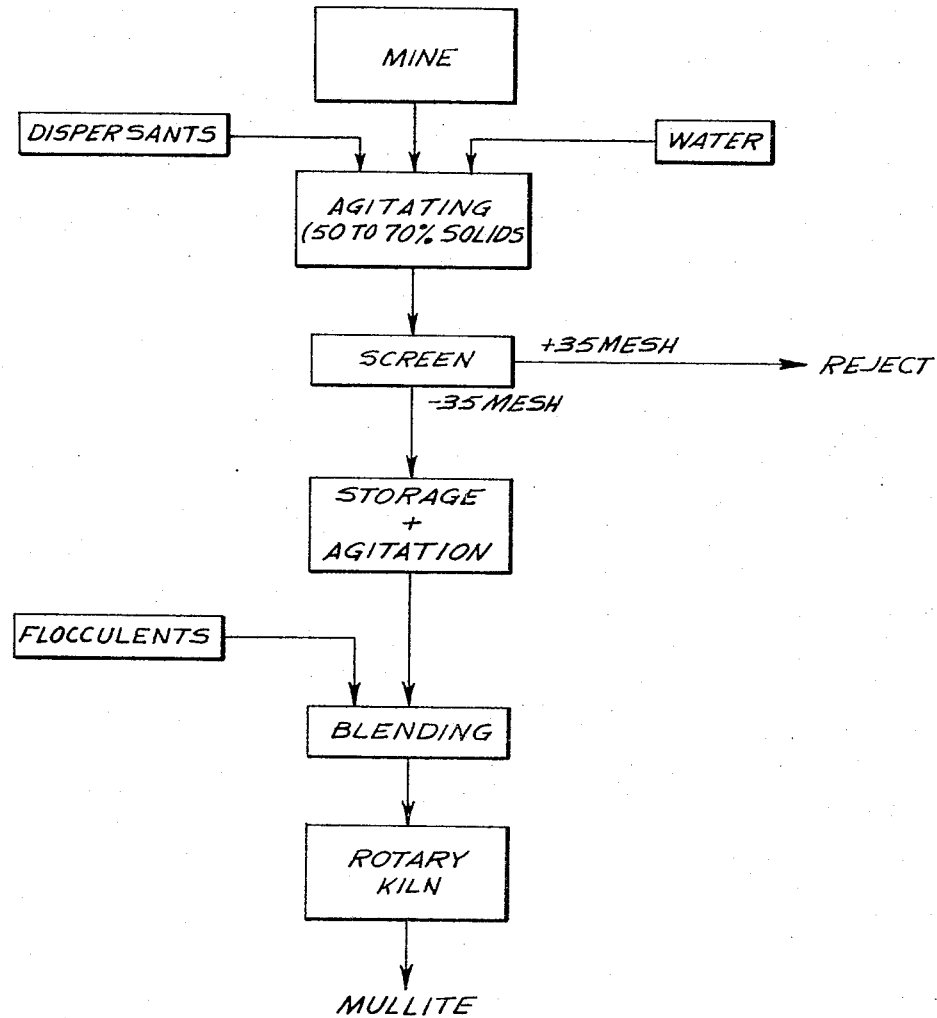
FIG. 2 is a flow sheet showing a modification of the process.

If flocculation is desired, as shown in the flow diagram of FIG. 2, the suspended bauxite material is then pumped to a pug mill where it is blended with a flocculating agent. Other suitable blenders such as a Simpson or Clearfield mixer may also be employed. The flocculating agent aggregates the fine particles to an average sizing of about .015″.

Many flocculating agents have been tested and found suitable in the practice of the invention. For example, synthetic guar gum, "Aerofloc," a proprietary agent sold by American Cyanamid Co., "Separan," a proprietary agent sold by Dow Chemical Corp. and mineral acids have been successful flocculants. Synthetic guar gum is a free flowing whitish powder which is the refined endosperm of the guar seed. It is a polysaccharide and consists principally of a complex carbohydrate polymer of galactose and mannose.

The flocculating agent may be added in amounts from about 0.1 to 1%, by weight, based on the total weight of dry solids in the blender. The actual amount of flocculating agent added is governed by the particular agent used and economy. A particularly good and preferred flocculating agent for the purposes of this invention is concentrated sulfuric acid (i.e. 98.0% $H_2SO_4$). This flocculant works particularly well in amounts of from 0.4 to 0.8% per weight unit of dry solid.

The purpose of flocculating the material after dispersion and impurity removal is to reduce the chance of sludge buildup at the mouth of the rotary kiln to which it is subsequently fed. Also, a material dust loss in the kiln is prevented.

The flocculate or slurry is easily fed from the flocculating tank to a rotary kiln. The flocculate or slurry is moved through the kiln at such a rate that the bauxitic material has a kiln residence time of about from 2½ to 5 hours. It is desirable that the material be in the burning zone of the kiln for a period of from 45 minutes to 2 hours for the best results. The burning zone temperature of the kiln is maintained between about 2900° F. to just below the incipient fusion temperature of the bauxitic material, which latter temperature is of the order of about 3360° F. Accordingly, a particularly useful range of temperatures according to this invention is from about 2900° F. to about 3300° F. It is particularly desirable that the burning zone temperature be maintained close to 3300° F. since at about this temperature the mullite crystals will attain maximum crystal growth, assuming close, dense packing.

It has been discovered that mullite crystals effectively double in size for each 200° rise in temperature at a burn between 2900° F. and 3300° F. Large crystal sizes are desirable since they stabilize the mullite grain aggregate and reduce voids, and increase the refractoriness and resistance to subsidence at elevated temperatures in subsequently formed mullite brick. Bauxitic material, when burned at temperatures below 2900° F., was found to have distressingly small crystal size, many voids, and a ground mass of unconverted alumina and silica. Unconverted silica is particularly undesirable because of the crystal phase changes silica undergoes during heating and cooling. These crystal phase changes (reversible inversion of cristobalite, tridymite, etc.) can lead to brick failure.

Crystal size is important. If an optimum or maximum size is not reached during the operation of burning the grain, ultimate shapes formed from the grain, when subjected to temperatures above the grain burning temperature, increase in size due to increase in mullite crystal size, thus expanding and destroying the shape. We do not know, in precise numerical dimensions, what the optimum crystal size is. We do know, however, that by following the teachings of this invention, satisfactory size is obtained.

Product grain size of from +65 mesh to 2″ is considered to be the most suitable size for subsequent processing for brickmaking operations.

The following examples are illustrative of the teachings of the invention.

EXAMPLE I

Crude Alabama bauxite, having the following typical oxide chemical analysis, by weight, on an oxide ignition free basis, was placed in a 55 gal. dispersing tank:

| | Percent |
|---|---|
| $SiO_2$ | 21.3 |
| $Al_2O_3$ | 75. |
| $TiO_2$ | 2.6 |
| $Fe_2O_3$ | 1.1 |
| CaO | 0.1 |
| MgO | Neg. |
| Alkalies | 0.1 |

A suitable amount of water was added to the crude ore in the tank along with a mixture of 0.15% of sodium phosphate (33% $Na_2O$ and 67% $P_2O_5$) and 0.5% $NH_4OH$ in order to provide a 50% solid concentration. The mixture was agitated with a mechanical stirrer at about 400 r.p.m. to disperse the bauxitic material and provide a uniform, almost colloidal, suspension. The slurry or suspension was passed through a 35 mesh screen and the +35 mesh impurities were removed. The impurities were found to consist primarily of nodules of hydrated iron or iron salts such as pyrite, the total amount of impurities being about 3.1%, by weight, of the feed material. The −35 mesh bauxitic material was analyzed on an oxide basis with the following results (weight percentages):

| | Percent |
|---|---|
| $SiO_2$ | 21.3 |
| $Al_2O_3$ | 75.7 |
| $TiO_2$ | 2.2 |
| $Fe_2O_3$ | 0.5 |
| CaO | 0.08 |
| MgO | Neg. |
| Alkalies | 0.1 |

The particle size (diameter) of 95% of the material was about 3 microns and the small amount of $Fe_2O_3$ remaining was uniformly distributed with the $Al_2O_3$ and $SiO_2$. The −35 mesh material was fed to a storage tank and agitated at about 20 r.p.m. for a brief period of time (less than an hour) and subsequently pumped to a pug mill where it was blended and flocculated with 0.4% of 98.0% $H_2SO_4$. The flocculate was fed to a 100 ft. long rotary kiln. The material was held in the kiln for about 4 hours, 1½ hours of which was residence time in the burning zone. The burning zone was maintained at about 3300° F. The grain material discharged from the kiln had a particle size of about ½ inch, and after removal from the kiln, was analyzed. The grain was found to contain mullite crystals substantially larger than were formed when the same raw material was burned at temperatures less than 2900° F.; and the mullite appeared to have achieved well-packed orientation and excellent crystal growth.

EXAMPLE II

South American bauxite containing about 1.5% of iron, calculated as $Fe_2O_3$, is processed in the same manner as in Example I, the suspension contains about .5% of iron. The material is fed to a rotary kiln and held at about 3300° F. for about 1 hour to provide substantially complete crystal growth.

Other bauxitic materials may be processed in accordance with the invention with similarly good results.

EXAMPLE III

Crude Alabama bauxite, having the following typical chemical analysis, by weight, on an ignition free oxide basis, was placed in a 55 gal. dispersing tank:

| | Percent |
|---|---|
| $SiO_2$ | 21.3 |
| $Al_2O_3$ | 75. |
| $TiO_2$ | 2.6 |
| $Fe_2O_3$ | 1.1 |
| CaO | 0.1 |
| MgO | Neg. |
| Alkalies | 0.1 |

A suitable amount of water was added to the crude ore in the tank along with a mixture of 0.15% of sodium phosphate (33% $Na_2O$ and 67% $P_2O_5$) and 0.4% NHaOH in order to provide a 50% solid concentration. The mixture was agitated with a mechanical stirrer at about 400 r.p.m. to disperse the bauxitic material and provide a uniform, almost colloidal, suspension. The slurry or suspension was passed through a 35 mesh screen and the +35 mesh impurities were removed. The impurities were found to consist primarily of nodules of hydrated iron or iron salts such as pyrite, the total amount of impurities being about 3.1%, by weight, of the feed material. The −35 mesh bauxitic material was analyzed on an oxide basis, with the following results (weight percentages):

| | Percent |
|---|---|
| $SiO_2$ | 21.3 |
| $Al_2O_3$ | 75.7 |
| $TiO_2$ | 2.2 |
| $Fe_2O_3$ | 0.5 |
| CaO | 0.08 |
| MgO | Neg. |
| Alkalies | 0.1 |

The particle size (diameter) of 95% of the material was about 3 microns and the small amount of $Fe_2O_3$ remaining was uniformly distributed with the $Al_2O_3$ and $SiO_2$. The −35 mesh material was fed to a storage tank and agitated at about 20 r.p.m. for a brief period of time (less than an hour) and subsequently fed to a 100 ft. long rotary kiln. The material was held in the kiln for about 4 hours, 1½ hours of which was residence time in the burning zone. The burning zone was maintained at about 3300° F. The grain material discharged from the kiln had a particle size of about ½ inch, and after removal from the kiln, was analyzed. The grain was found to contain mullite crystals substantially larger than were formed when the same raw material was burned at temperatures less than 2900° F.; and the mullite appeared to have achieved well-packed orientation (FIG. 2 can be considered representative) and excellent crystal growth.

EXAMPLE IV

South American bauxite containing about 1.5% of iron, calculated as $Fe_2O_3$, is processed in the same manner as in Example III, the suspension contains about .5% of iron. The material is fed to a rotary kiln and held at about 3300° F. for about 1 hour to provide substantially complete crystal growth.

Other bauxitic deposits may be processed in accordance with the invention with similarly good results.

It is intended that the foregoing description and examples be construed as illustrative and not in limitation of the invention.

We claim:

1. In a process for producing relatively volume stable mullite aggregate from crude bauxite containing at least of the order of 70 to 80% $Al_2O_3$, by weight, on an oxide ignition free basis, the steps comprising forming the bauxite into an aqueous suspension by agitating and dispersing the bauxite to yield a uniform mixture consisting of bauxitic material and nonbauxitic impurities, substantially all of said impurities having a particle size greater than the bauxite material, removing the nonbauxitic impurities from the mixture, blending the suspension with a flocculating agent to form a relatively coarse aggregate, burning the resulting aggregate in a rotary kiln at a temperature of from 2900° F. to just below the incipient fusion point, the residence time of the material in the kiln being of the order of at least 2 hours and recovering substantially iron-free mullite grain mineralogically characterized by relatively large and stable, well-packed, crystals with few voids.

2. In a mullite process for producing relatively stable mullite aggregate from crude bauxite, the bauxite containing at least of the order of 72 to 75% $Al_2O_3$, by weight, on an oxide ignition free basis, the steps comprising forming the bauxite into an aqueous suspension by agitating and dispersing the bauxite until all of the bauxitic material has a particle size of less than 10 microns, screening the suspension to remove coarse impurities consisting predominantly of iron, blending the suspension with a flocculating agent to form a relatively coarse aggregate, burning the aggregate in a rotary kiln at a temperature of from 2900° F. to just below the incipient fusion point and recovering substantially iron-free mullite grain mineralogically characterized by relatively large and stable, well-packed crystals with few voids.

3. In a process for producing relatively stable substantially iron-free mullite aggregate from crude bauxite, the bauxite containing at least on the order of 70 to 80% $Al_2O_3$, by weight, on an oxide ignition free basis, the steps comprising mixing a quantity of the bauxite with about from 0.1 to 2%, by weight, of dispersing agents per unit of dry solids to yield a fine suspension containing at least 50%, by weight, of solids, substantially all of the solids having a particle size of less than 10 microns, removing any material having a particle size greater than 35 mesh, blending the suspension with from 0.1 to 1%, by weight, of a flocculating agent to form a relatively coarse aggregate, burning the aggregate in a rotary kiln at a temperature of from 2900° F. to just below the incipient fusion point the residence time of the material in the kiln being of the order of at least 2 hours and recovering substantially iron-free mullite grain mineralogically characterized by relatively large and stable, well-packed, crystals with few voids.

4. In a process of producing relatively stable, substantially iron-free mullite aggregate from crude bauxite, the bauxite containing at least of the order of 70 to 80% $Al_2O_3$, by weight, on an oxide ignition free basis, the steps comprising mixing a quantity of the bauxite with about .1 to 1%, by weight, of a dispersing agent per unit of dry solids to yield a fine suspension containing from 50 to 70%, by weight, of solids, substantially all of the solids being −35 mesh fines and having an average particle size of from about 2 to 5 microns, screening the material with a 35 mesh sieve, the +35 mesh material being primarily nonbauxitic impurities which are discarded, blending the suspension with from 0.4 to 0.8% of a flocculating agent per unit of dry solids to yield a relatively coarse aggregate, burning the solids in a rotary kiln at a temperature of from 2900 to 3300° F. the residence time of the material in the kiln being of the order of at least 2 hours and recovering substantially iron-free mullite grain mineralogically characterized by relatively large and stable, well-packed, crystals with few voids.

5. The process of claim 4 in which the dispersing agent consists of a mixture of sodium phosphate glass analyzing approximately 67% $P_2O_5$, and ammonia.

6. The process of claim 4 in which the flocculating agent is concentrated sulfuric acid.

7. A relatively stable, substantially iron-free mullite grain produced by forming crude bauxite into an aqueous suspension by agitating and dispersing the bauxite to yield a uniform mixture consisting of bauxitic material and nonbauxitic impurities, said impurities having a particle size substantially greater than the bauxitic material, removing the nonbauxitic impurities from the mixture, blending the suspension with a flocculating agent to yield a relatively coarse aggregate, burning the mixture in a rotary kiln at a temperature of from 2900° F. to just below the incipient fusion point the residence time of the material in the kiln being of the order of at least 2 hours, and recovering mullite grain.

8. In a process for producing relatively volume stable mullite aggregate from crude bauxite, the bauxite containing at least of the order of 70 to 80%. $Al_2O_3$, by weight, on an oxide ignition free basis, the steps comprising forming the bauxite into an aqueous suspension by agitating and dispersing the bauxite to yield a uniform mixture consisting of bauxitic material and nonbauxitic impurities, substantially all of said impurities having a particle size greater than the bauxite materal, removing the nonbauxitic impurities from the mixture, dewatering the mixture to a solids content of about 40 to 75%, blending the mixture with a flocculating agent, burning the flocculate in a rotary kiln at a temperature of from 2900° F. to just below the incipient fusion point the residence time of the material in the kiln being of the order of at least 2 hours and recovering substantially iron-free mullite grain mineralogically characterized by relatively large and stable, well-packed, crystals with few voids.

9. In a process for producing relatively volume stable mullite aggregate from crude bauxite, the bauxite containing at least of the order of 70 to 80%. $Al_2O_3$, by weight, on an oxide ignition free basis, the steps comprising forming the bauxite into an aqueous suspension by agitating and dispersing the bauxite to yield a uniform mixture consisting of bauxitic material and nonbauxitic impurities, substantially all of said impurities having a particle size greater than the bauxite material, removing the nonbauxitic impurities from the mixture, burning the resulting mixture in a rotary kiln at a temperature of from 2900° F. to just below the incipient fusion point the residence time of the material in the kiln being of the order of at least 2 hours and recovering substantially iron-free mullite grain mineralogically characterized by relatively large and stable, well-packed, crystals with few voids.

10. In a process of producing relatively stable, substantially iron-free mullite aggregate from crude bauxite, the bauxite containing at least of the order of 70 to 80% $Al_2O_3$, by weight, on an oxide ignition free basis, the steps comprising mixing a quantity of the bauxite with about .1 to 1%, by weight, of a dispersing agent per unit of dry solids to yield a fine suspension containing from 50 to 70%, by weight, of solids, substantially all of the solids being −35 mesh fines and having an average particle size of from about 2 to 5 microns, screening the material with a 35 mesh sieve, the +35 mesh material being primarily nonbauxitic impurities which are discarded, burning the solids in a rotary kiln at a temperature of from 2900 to 3300° F. the residence time of the material in the kiln being of the order of at least 2 hours and recovering substantially iron-free mullite grain mineralogically characterized by relatively large and stable, well-packed, crystals with few voids.

11. The process of claim 10 in which the burning temperature in the rotary kiln is about 3300° F. and the residence time of the material at this temperature is about 45 minutes to 2 hours.

References Cited

UNITED STATES PATENTS

| | | | |
|---|---|---|---|
| 1,983,272 | 12/1934 | Earle | 23—182 |
| 2,036,617 | 4/1936 | Bechtner et al. | 106—72 X |
| 2,254,816 | 10/1950 | Lyons | 23—110 |
| 2,536,122 | 1/1951 | Berterelli et al. | 23—110 |

OTHER REFERENCES

Perry-Chem. Engineers Handbook, Third Edit. (1950) pp. 829, 830, 1190, 1608 and 1609 relied on.

M. E. Tyrrell, Bureau of Mines Report 5957, pp. 1–7 relied on.

OSCAR R. VERTIZ, *Primary Examiner*.

MILTON WEISSMAN, *Examiner*.

A. J. GREIF, *Assistant Examiner*.